(12) United States Patent
Lundgren

(10) Patent No.: US 7,389,583 B2
(45) Date of Patent: Jun. 24, 2008

(54) METHOD OF MANUFACTURING A STATOR COMPONENT

(75) Inventor: Jan Lundgren, Grundsund (SE)

(73) Assignee: Volvo Aero Corporation, Trollhatten (SE)

( * ) Notice: Subject to any disclaimer, the term of this patent is extended or adjusted under 35 U.S.C. 154(b) by 42 days.

(21) Appl. No.: 11/162,139

(22) Filed: Aug. 30, 2005

(65) Prior Publication Data

US 2006/0000077 A1   Jan. 5, 2006

Related U.S. Application Data

(63) Continuation of application No. PCT/SE2004/000387, filed on Mar. 16, 2004.

(30) Foreign Application Priority Data

Mar. 21, 2003   (SE) ..................... 0300770

(51) Int. Cl.
*B21K 25/00* (2006.01)
*H02K 15/00* (2006.01)

(52) U.S. Cl. ..................... 29/889.22; 29/596

(58) Field of Classification Search .............. 29/889.22, 29/889.2, 889.21, 889, 889.23, 890.01, 596, 29/592.1, 259; 310/259, 164; 415/209.2
See application file for complete search history.

(56) References Cited

U.S. PATENT DOCUMENTS

| | | | | |
|---|---|---|---|---|
| 4,511,306 | A | * | 4/1985 | Hultgren ..................... 415/136 |
| 5,176,496 | A | * | 1/1993 | Correia et al. ........... 415/209.2 |
| 5,177,954 | A | * | 1/1993 | Paul .......................... 60/39.54 |
| 5,248,240 | A | * | 9/1993 | Correia ..................... 415/209.1 |
| 5,813,832 | A | * | 9/1998 | Rasch et al. ................. 415/200 |
| 2004/0056557 | A1 | * | 3/2004 | Enomoto et al. ............ 310/218 |
| 2004/0158984 | A1 | * | 8/2004 | Lundgren ................ 29/889.21 |

FOREIGN PATENT DOCUMENTS

| | | |
|---|---|---|
| DE | 19544817 | 6/1997 |
| WO | WO 03020469 | 3/2003 |

OTHER PUBLICATIONS

International Search Report from corresponding PCT/SE2004/000387.
International Preliminary Exam. Report from corresponding PCT/SE2004/000387.

* cited by examiner

*Primary Examiner*—John C Hong
(74) *Attorney, Agent, or Firm*—WRB-IP

(57) ABSTRACT

The invention relates to a method for manufacturing a stator component that is intended in operation to guide a gas flow and to transfer loads. The component is constructed of at least two sectors in the direction of its circumference. The sectors are cast in separate pieces, positioned adjacent to each other and joined together by welding.

17 Claims, 2 Drawing Sheets

METHOD OF MANUFACTURING A STATOR COMPONENT

The present application is a continuation of International Application PCT/SE2004/000387, filed Mar. 16, 2004.

BACKGROUND AND SUMMARY

The present invention relates to a method for manufacturing a stator component that is intended in operation to guide a gas flow and to transfer loads.

The stator component can, for example, be utilized in a gas turbine and, in particular, in a jet engine.

By jet engine is meant various types of engine that take in air at a relatively low speed, heat it up by combustion and expel it at a much higher speed. The term jet engine includes, for example, turbo-jet engines and turbo-fan engines.

Such a stator component that comprises an outer and an inner ring with wall elements arranged between the rings, can be arranged with the aim of primarily being load-transferring in a radial and axial, and also in a tangential, direction. The wall elements can, for example, form hollow blades, which are usually such a shape that they present as little air resistance as possible. The component can, for example, be arranged in a rear or front support, or in an intermediate housing in a jet engine. In such cases, the blades are often called struts. Struts can, however, also be created by other types of part than hollow blades.

According to a previously-known technique, wall elements in the form of hollow blades are arranged spaced apart in the direction of the circumference of the component between an inner and an outer ring. The joining of the hollow blades to the rings is carried out by welding. Each of the rings is manufactured first with parts projecting in a radial direction that have the same cross-section and dimension as the blades.

Such projecting parts are often called stubs. Each of the blades is thereafter welded on to such a projecting part using a butt joint. The parts projecting in a radial direction are normally milled out of a ring.

This is a time-consuming and expensive operation.

According to another previously-known technique, the whole stator component is cast in a single stage. This requires, however, a large and very complicated casting facility.

It is desirable to achieve a method for manufacturing a stator component that provides a better weight-optimized component in relation to previously-known techniques, with the same or increased durability and life. In particular, however, a timesaving and more cost-effective manufacturing method is sought.

According to an aspect of the present invention, the component is constructed of at least two sections in the direction of its circumference, and the sectors are cast in separate pieces, positioned adjacent to each other and joined together by welding.

As the sectors are cast individually, there are certain advantages in relation to casting the whole stator component in a single step. One advantage is that in the event of a fault or a defect, it is not necessary to reject a whole stator component, but only one sector. An additional advantage is that the casting is less complex, with smaller parts of a less complicated design.

According to an aspect of the invention, the surface of each of the sectors that is intended to be welded is continuous. In other words, the welding surface has no interruptions or sudden changes in direction. By this means, it is possible to have an efficient welding process that provides a highly durable welded joint. In addition, the surface of each of the sectors that is intended to be welded is essentially of the same thickness in cross-section over the length of the whole surface. By this means, there is considerably less need to change the welding parameters during the welding process.

According to another aspect of the invention, other parts of the sector adjacent to the surface that is intended to be welded are set back slightly in the direction of the circumference relative to the welding surface in order not to interfere with the weld path. This applies, in particular, when the sectors are cast in such a shape that they each have at least one rib that extends in the direction of the circumference and projects in an axial direction. The sector is then cast in such a shape that the rib extends in such a way that there is a gap in the direction of the circumference between the end of the rib and the edge of the sector. This makes it possible to join the sectors together in a simple way after the sectors have been placed adjacent to each other. After the sectors have been placed adjacent to each other in the direction of the circumference, the sectors are thus joined by welding together the sectors' adjacent edges between the ends of the ribs in a radial direction.

According to a further aspect of the invention, after the welding together, the space between two adjacent rib edges is filled by deposition of material so that the ribs form a continuous structure in the direction of the circumference.

BRIEF DESCRIPTION OF THE DRAWINGS

The invention will be described in greater detail in the following, with reference to the embodiment that is shown in the attached drawings, in which.

DETAILED DESCRIPTION

Figure 1:
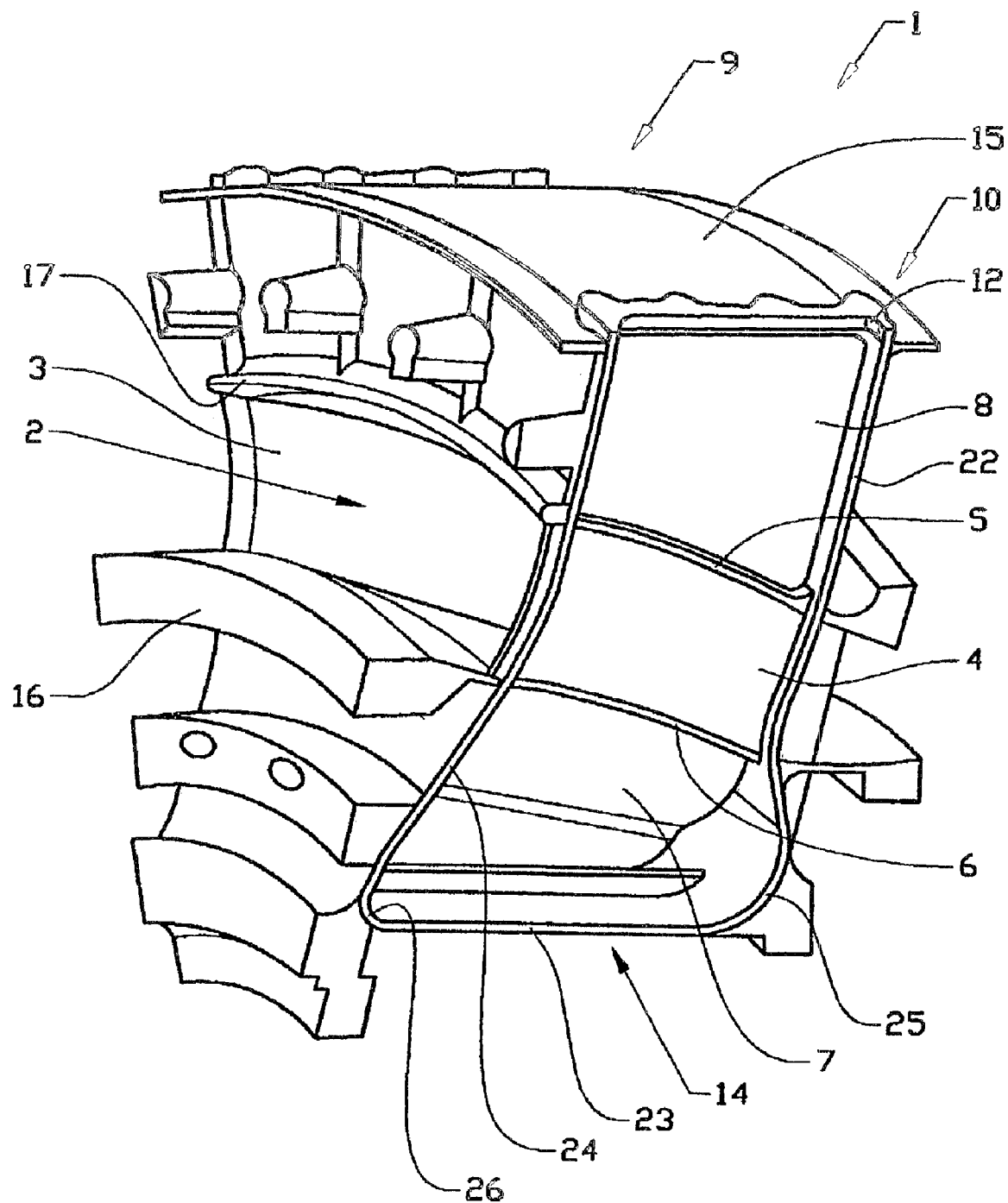
FIG. 1 shows a cast sector in perspective view.

FIG. 1 shows a cast sector 1 in a perspective view.

The sector 1 has a gas duct 2 that goes right through, principally in an axial direction. It is also possible to have one or more gas ducts in a radial direction for compressor flow (not shown), and also in certain cases fan flow.

The sector 1 has been cast with wall elements 4, 5, 6, 7, 8 that form a continuous structure in the radial direction in order to transfer loads. In the illustrated embodiment, the sector 1 comprises a first wall element 3 and a second wall element 4, which extend in the intended radial direction of the stator component and are arranged at a distance from each other in order to define between them the gas duct 2 in the direction of the circumference of the stator component.

Figure 2:
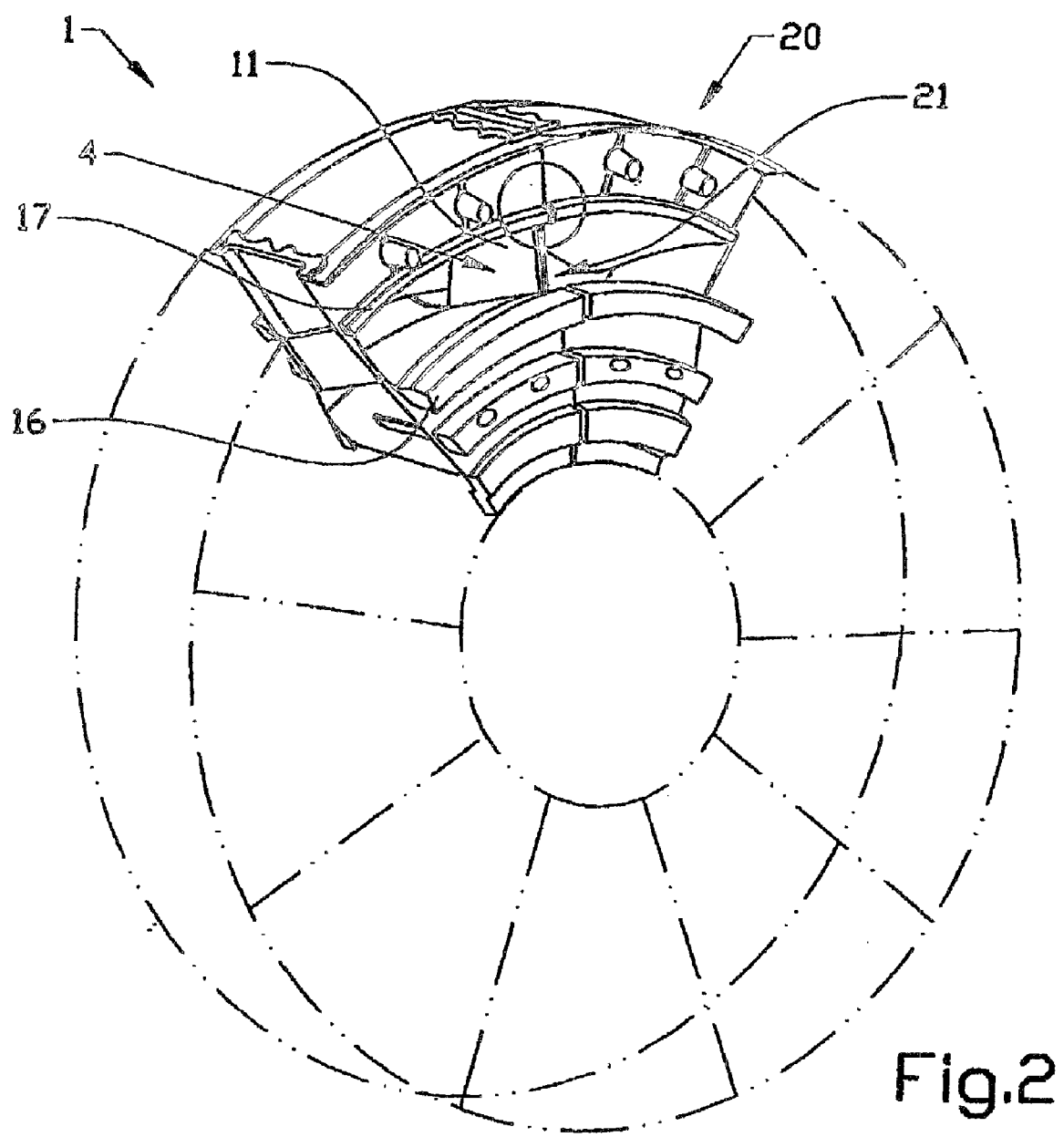
FIG. 2 shows the stator component constructed of a plurality of sectors according to FIG. 1 in the direction of its circumference.

When two sectors are joined together, the continuous wall structure 4, 5, 6, 7, 8 together with a corresponding wall structure 21 of an adjacent sector form a device 11 extending in the radial direction of the component for guiding the gas flow and transferring loads in a radial/axial/tangential direction during operation of the component, see FIG. 2. This device 11 for guiding/load transference is usually called a strut. In the illustrated embodiment, the division between two adjacent sectors is thus made straight through such a strut. For certain applications, it can, however, be more appropriate to make the division between the struts. According to the illustrated embodiment, however, the stator component comprises such a complicated inner hub section that the only reasonable division is to go through the struts.

The sector 1 comprises, in addition, a third wall element 5, that extends between the first wall element 3 and the second wall element 4 and defines the gas duct 2 radially outwards. The sector 1 comprises, in addition, a fourth wall element 6 that extends between the first wall element 3 and the second wall element 4 and defines the gas duct radially inwards.

The ends 9, 10 of the sector 1 in the direction of the circumference have a design that complements the ends of the adjacent sector, in order that, when they are placed next to each other, they will at least essentially fit tightly against each other. The ends 9, 10 in the direction of the circumference have, more specifically, a rectilinear delimitation in the radial direction. As a result of this design, two adjacent sectors can be joined together in the direction of the circumference in a relatively easy way from the outside.

Each of the ends 9, 10 of the sector 1 comprises an elongated continuous surface 22, 23, 24, 25, 26 which delimits the sector 1 in the direction of the circumference and which is intended to be welded. The welding surface extends at least partially around the sector body at the periphery of the sector. The welding surface comprises a first section 22 which extends principally in a radial direction, a second section 23 which extends principally in an axial direction, and a third section 24 which extends principally in a radial direction. The welding is carried out in one continuous operation, from a boss 12 at an outer end of the welding surface in a radial direction, radially inwards, thereafter axially and finally radially outwards, back to the boss 12. The welding surface thus forms essentially a U shape. Each of the parts 25, 26 of the welding surface that form a change of direction between radial and axial direction is evenly rounded off. In addition, the welding surface is essentially of the same thickness in cross section over the whole length of the surface. The welding surface can thus be the to constitute one continuous curve.

Other parts of the sector adjacent to the surface that is intended to be welded are set back slightly in the direction of the circumference relative to the welding surface in order not to interfere with the weld path.

Examples of such parts are the edges of the third and fourth wall elements 5, 6 in the direction of the circumference.

Several different welding methods are possible, but preferably laser or electron beam welding are used. The first and the second wall elements 3, 4 thus extend essentially in the radial direction of the component 1.

In addition, they have an extent essentially in the axial direction of the component.

In addition, the sector 1 has a curved plate 14 for delimiting the sector radially inwards and a curved plate 15 for delimiting the sector radially outwards.

Figure 3:
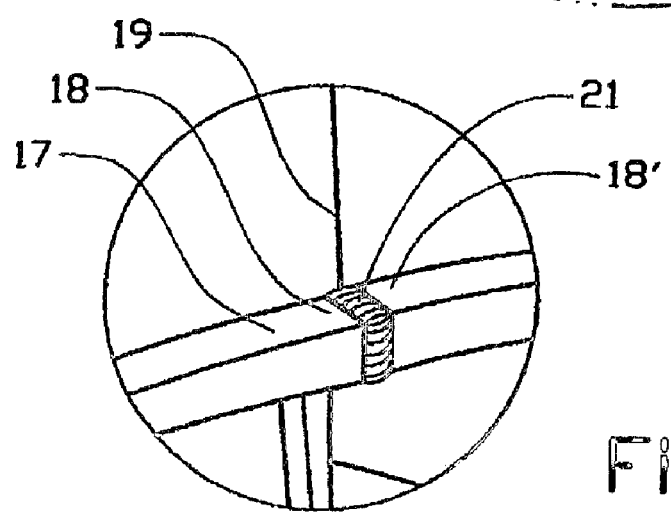
FIG. 3 shows an enlarged view of a part of the component according to FIG. 2, and more specifically the dividing area between two sectors, where the ribs of two adjacent sectors have been joined together by the deposition of metallic material.

The sector 1 is cast in such a shape that it has at least one rib 16, 17, see FIG. 1, which extends in the direction of the circumference and projects in an axial direction. The ribs 16, 17 extend different distances in the radial direction. In addition, there is a gap in the direction of the circumference between the end 18 of the rib 17 and the edge 19 of the sector, see FIG. 3. This is in order to make the welding surface accessible for the welding process.

After the positioning of the sectors next to each other in the direction of the circumference, see FIG. 2, the sectors are thus joined by welding the sectors' adjacent edges 19 between the ends 18, 18' of the ribs in a radial direction. Due to the design of the sectors described above, it is possible to weld the dividing line between two adjacent sectors. This is carried out, as mentioned above, preferably in one continuous run per weld path.

After the joining together, the space between two adjacent rib edges 18, 18' is filled by deposition of metallic material 21 so that the ribs form a continuous structure in the direction of the circumference. The continuous rib structure in the direction of the circumference forms a reinforcing structure in the form of a circular flange, and is used to make a joint in an axial direction to adjacent parts and/or to bearings and seals in the gas turbine.

A plurality of identical sections 1, 20, or sections that have different shapes but identical cross-sections, manufactured according to the description above, are thus arranged alongside each other, see FIG. 2.

The stator component can, for example, form a load bearing structure between bearings arranged radially or axially internally and structures attached externally.

During the welding together, a space is created between two wall elements of two adjacent sectors. These spaces can now be used to house various means for supplying the component with, for example, oil and/or air, such as intakes and outlets, for housing instruments, such as electrical and metallic cables for transmission of information relating to measured pressure and/or temperature. The spaces can also be used for the introduction of coolants.

The stator component can, for example, form an intake part, an intermediate housing, a turbine exhaust housing (that is, a terminating housing part), or a part of a housing for a gas turbine. Its main task is acting as an attachment for bearings, transferring loads, and providing a duct for gasses.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The invention is not to be regarded as being limited to the embodiments described above, a number of additional variants and modifications being possible within the framework of the following claims.

What is claimed is:

1. A method for manufacturing a stator component that is intended for a jet engine and intended in operation to guide a gas flow and to transfer loads, comprising constructing the component of at least two sections in the direction of its circumference, casting the sections in separate pieces, positioning the at least two sections adjacent to each other, joining the at least two sections together by welding, casting each section of the at least two sections in such a shape that a first, radially and axially extending wall element and a second, radially and axially extending wall element are arranged at a distance from each other, an inner plate and an outer plate are disposed at opposite ends of and substantially perpendicular to the first and second wall elements, the first and second walls elements defining between them a gas duct defining a flow path extending in an axial direction of the component, and joining two wall elements, one from each of two adjacent sections, to each other to form together a radially and axially extending strut, which is closed for an incoming axial flow so that there will be no axial flow path between the joined wall elements.

2. A method according to claim 1, wherein a surface of each section of the at least two sections that is intended to be welded, extends at least partially around a body of the section and is arranged at its periphery.

3. A method according to claim 2, wherein the surface of each section of the at least two sections that is intended to be welded extends in both a radial and an axial direction.

4. A method according to claim 3, wherein the part of the welding surface that forms a change of direction between radial and axial direction is evenly rounded off.

5. A method according to claim 2, wherein the surface of each section of the at least two sections that is intended to be welded is continuous.

6. A method according to claim 2, wherein the surface of each section of the at least two sections that is intended to be welded is essentially the same thickness in cross section over a whole length of the surface.

7. A method according to claim 2, wherein other parts of each section of the at least two sections adjacent to the surface that is intended to be welded are set back in the direction of the circumference in relation to the welding surface.

8. A method according to claim 1, comprising casting each section of the at least two sections in such a shape that it has at least one rib that extends in a direction of the circumference and projects in an axial direction.

9. A method according to claim 8, wherein the at least one rib extends in such a way that, for each section of the at least two sections, there is a gap in a direction of the circumference between an end of the rib and an edge of the section.

10. A method according to claim 9, comprising, after the at least two sections have been placed adjacent to each other in the direction of the circumference, joining the sectors by welding together adjacent edges of the sections between ends of the ribs.

11. A method according to claim 10, comprising, after the welding together, filling the space between two adjacent rib edges by deposition of material so that the ribs form a continuous structure in the direction of the circumference.

12. A method according to claim 1, comprising casting two sections that are intended to be joined together in such shapes that ends of the two sections in a direction of the circumference have designs that complement each other, in order that, when they are placed next to each other, they will at least essentially fit tightly against each other.

13. A method according to claim 1, comprising casting two sections that are intended to be joined together in such shapes that end surfaces of ends of the two sections extend in a direction of the circumference parallel to a plane in a radial direction.

14. A method according to claim 1, comprising joining two adjacent sections together by laser welding from an outside of at least one of the sections.

15. A method according to claim 1, comprising casting each section of the at least two sections with wall elements that form a continuous structure in a radial direction.

16. A method according to claim 1, comprising casting each section of the at least two sections in such a shape that the first wall element and the second wall element are arranged in relation to each other in such a way that in the intended position in the component they at least partially extend essentially in the radial direction of the component.

17. A method according to claim 1, wherein the stator component is intended for a gas turbine.

* * * * *